United States Patent [19]

Hiroi

[11] Patent Number: 5,059,880
[45] Date of Patent: Oct. 22, 1991

[54] DIGITAL CONTROL SYSTEM

[75] Inventor: Kazuo Hiroi, Hachiooji, Japan

[73] Assignee: Kabushiki Kaisha Toshiba, Kawasaki, Japan

[21] Appl. No.: 414,453

[22] Filed: Sep. 29, 1989

[30] Foreign Application Priority Data

Oct. 5, 1988 [JP] Japan .................... 63-251254

[51] Int. Cl.$^5$ ............................... G05B 11/42
[52] U.S. Cl. .................... 318/610; 318/609; 318/561; 364/161; 364/162; 364/163
[58] Field of Search .............. 318/610, 609, 561; 364/161-163

[56] References Cited

U.S. PATENT DOCUMENTS

| 3,582,629 | 8/1968 | Ross ........................... 318/610 |
| 3,770,946 | 11/1973 | Fertik et al. .................. 364/162 |
| 4,418,381 | 11/1983 | Molusis et al. ............. 318/561 X |
| 4,727,303 | 2/1988 | Morse et al. .................. 318/616 |

FOREIGN PATENT DOCUMENTS 2236224 1/1975 France .
2524169 9/1983 France .

OTHER PUBLICATIONS

"Microprocessors in Instruments and Control", Chapter 6, Velocity Algorithm, Robert J. Bibbero, 1977.
"Distillation Columns An ISA Monograph", Chapter 8, Velocity—Control Algorithm, A. Eli Nisenfeld et al, 1981, Instrument Society of America, pp. 204–206.
The Basis and Application of the Digital Instrumentation Control System, Kazuo Hiroi, Ind. Technology Corp. (1987), pp. 90–95.

Primary Examiner—William M. Shoop, Jr.
Assistant Examiner—Saul M. Bergmann
Attorney, Agent, or Firm—Oblon, Spivak, McClelland, Maier & Neustadt

[57] ABSTRACT

A digital controller comprising a deviation calculator, a positional P-controlling calculation device, a velocity-type I-controlling calculation device, a signal converter, and an adder unit. The deviation calculator for subtracts a process variable of an object from a set point variable, to obtain a deviation. The positional P-controlling calculation device performs positional P-calculation on the deviation obtained by the deviation calculator. The velocity-type I-controlling calculation device performs velocity-type I-calculation on the deviation. The signal-converting device converts the velocity-type I-calculation output of the velocity-type I-controlling algorithm device, into a positional I-signal. The adder unit adds the positional I-signal obtained by the signal-converting device and the positional P-calculation output obtained by the positional P-controlling algorithm device, thereby obtaining a manipulative variable. The manipulative variable value is supplied to the object to control the object.

2 Claims, 6 Drawing Sheets

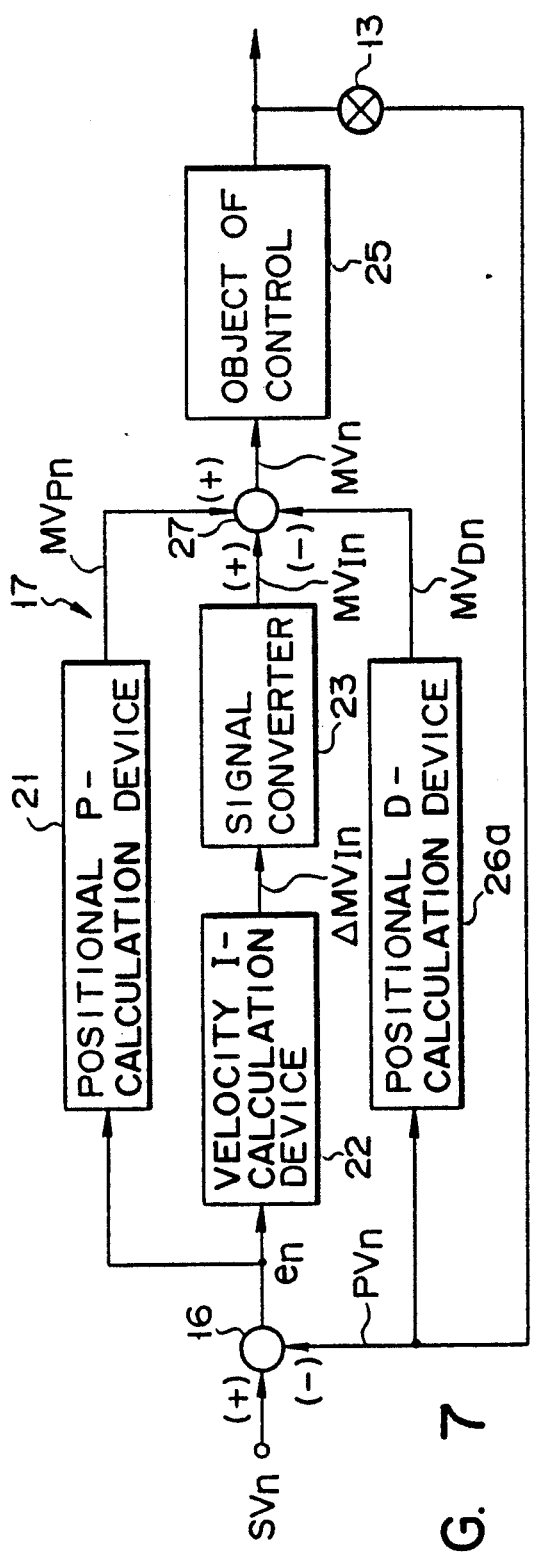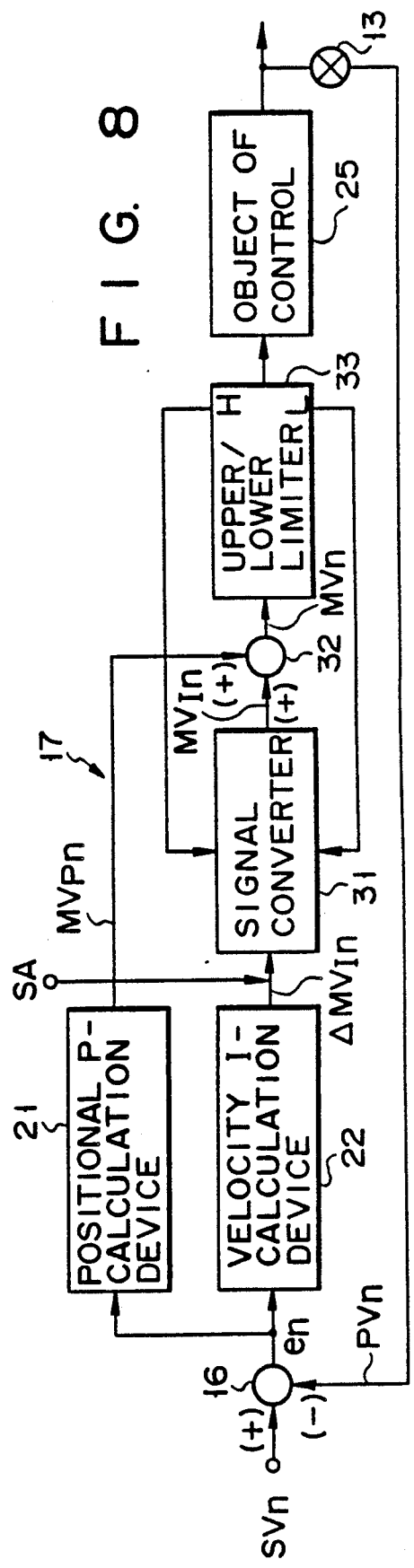

DIGITAL CONTROL SYSTEM

BACKGROUND OF THE INVENTION

1. Field of the Invention

The present invention relates to a digital control system which performs a PID (P: Proportional, I: Integral, D: Derivative) calculation by using positional and velocity algorithms, in accordance with the characteristics of each of the terms of the PID-calculation.

2. Description of the Related Art

Controllers are classified into two categories, i.e., analog PID calculational controllers and digital PID calculational controllers. Until very recently, analog PID calculational controllers have been widely used.

An analog calculational control system performs a PID calculation by using the following PID basic equation:

$$MV = K_p \left( e + \frac{1}{T_I} \int e \, dt + T_D \frac{de}{dt} \right) + MV_0 \quad (1)$$

where MV is the manipulative variable, e is deviation, $K_p$ is the proportional gain, $T_I$ is the integral action time, $T_D$ is the derivative time, and $MV_0$ is the initial value of the manipulative variable.

Recently, digital calculational control system have come into use in increasing numbers, due to the widespread use of electronic computers and the accomplishment of high-velocity processing of signals. A digital calculational control system includes a positional algorithm system and a velocity algorithm system.

A positional algorithm system performs a PI or PID calculation during each sampling period $\tau$, thereby obtaining a manipulative variable $MV_n$, where n is integer identifying the sampling period. More specifically, a PID calculational equation of the positional algorithm system can be shown by the following equation (2):

$$MV_n = K_p \left( e_n + \frac{\tau}{T_I} \sum_{i=1}^{n} e_i + \frac{T_D}{\tau} (e_n - e_{n-1}) \right) + MV_0 \quad (2)$$

A velocity algorithm system finds a change $\Delta MV_n$ in the MV, which occurs during each sampling period, and adds this change $\Delta MV_n$ to the output $MV_{n-1}$ acquired in the preceding sampling period, thereby obtaining the output $MV_n$ for the sampling period. More specifically PID calculational equation of the velocity algorithm system can be represented by the following equations (3a) and (3b):

$$\Delta MV_n = K_p \left( (e_n - e_{n-1}) + \frac{\tau}{T_I} e_n + \frac{T_D}{\tau} (e_n - 2e_{n-1} + e_{n-2}) \right) \quad (3a)$$

$$MV_n = MV_{n-1} + \Delta MV_n \quad (3b)$$

The equations (2), (3a) and (3b) are obtained from the basic equation (1).

In equations (2) and (3a), $e_n$, $e_{n-1}$, and $e_{n-2}$ are the deviations produced during the present sampling period, the preceding sampling period, and the sampling period preceding the preceding one, respectively. As can be understood from equation (2) with equations (3a) and (3b), the velocity algorithm system is advantageous over the positional algorithm system in the following respects:

(1). The calculation which the velocity algorithm system performs is easy since equations (3a) and (3b) have no $\Sigma$-terms.

(2) In the case of a velocity algorithm system which can be manually or automatically operated, it suffices to control an object in accordance with $MV_{n-1}$ after the manual calculation has been switched to the automatic calculation and to add $\Delta MV_n$ to $\Delta MV_{n-1}$. The output obtained during the preceding sampling period, i.e., $MV_{n-1}$, need not be adjusted to allow for the switching of the calculation mode. Hence, the calculation mode can be easily and smoothly changed from a manual one to an automatic one.

(3) The velocity algorithm system can accomplish a precise PID control, only if $\Delta MV_n$ is limited, or the gain thereof is adjusted. The system is, therefore, compatible with other arithmetic calculation devices. In other words, it can easily perform calculations on not only the signals generated in itself, but also the signals processed by the other calculation devices.

For the advantages described above, most direct digital control (DDC) system in practical use are of the velocity-type.

Two conventional digital controllers, which are a positional and a velocity-type, will be described in more detail with reference to FIG. 1 and FIG. 2, respectively.

The positional PID controller shown in FIG. 1 is designed to perform the calculation according to equation (2). As FIG. 1 shows, the controller comprises a detector 1 for detecting a process variable $PV_n$, a deviation calculator 2 for subtracting the value $PV_n$ detected by the detector 1, from a set point variable $SV_n$, thereby calculating a deviation $e_n$, and a positional PID calculation device 3 for performing a PID calculation according to equation (2), on the deviation $e_n$, thereby obtaining a manipulative variable $MV_n$. The device 3 supplies the value $MV_n$ to an object 4, thereby controlling the object 4 such that $SV_n$ becomes equal to $PV_n$.

The velocity-type PID controller illustrated in FIG. 2 is designed to perform calculations according to equations (3a) and (3b). As FIG. 2 shows, the velocity-type PID controller comprises a detector 1 for detecting a process variable $PV_n$, a deviation calculator 2 for subtracting the value $PV_n$ by the detector 1, from a set point variable $SV_n$, thereby calculating a deviation en, and a velocity type PID calculation device 5 for performing a PID calculation according to equation (3a), on the deviation $e_n$, thereby obtaining a change $\Delta MV_n$ in the value $MV_n$, and a velocity-position signal converter 6 for receiving the change $\Delta MV_n$ and performing a calculation according to equation (3b), thus converting the change $\Delta MV_n$ to $MV_n$. The converter 6 supplies the value $MV_n$ to an object 4, thereby controlling the object 4 such that SVn becomes equal to $PV_n$. Upper and lower limits H and L of manipulative variable $MV_n$ are set to the velocity-position signal converter 6.

The positional PID digital controller (FIG. 1) is disadvantageous in some respects. Firstly, it operates at a low velocity since equation (2) includes a $\Sigma$-term. Secondly, the bumpless switching is complex, which must be carried out for the manual-automatic mode switching. Thirdly, the controller must perform complex calculations on the signals processed by the other calculating devices.

The velocity-type PID digital controller (FIG. 2) is also disadvantageous in the following respect. If the set point variable $SV_n$ is altered at time n as is shown in FIG. 3, the output value $MV_n$ must be controlled as is indicated by the broken-line curve a. If the value $SV_n$ is altered at time n, and increased over the upper limit H by value c, the output value $MV_n$ must be controlled as is indicated by the solid-line curve b, that is, the controller must perform a D calculation to reduce $MV_n$ quickly to the upper limit H. This specific control, i.e., an abrupt reduction of $MV_n$ to the upper limit H, is difficult to accomplish. Even if it is successfully achieved, it cannot apply to a boiler. Should it be used in controlling a boiler, the opening of a valve supplying air or fuel into a combustion chamber would be reduced too much, increasing the possibility of incomplete combustion and, ultimately, an explosion. The velocity-type PID controller is disadvantageous in view of stability and safety.

SUMMARY OF THE INVENTION

The first object of the present invention is to provide a digital controller which performs either a positional PID calculation or a velocity-type PID calculation on a PID-calculation, in accordance with the characteristics of the PID-calculation terms.

The second object of the invention is to provide a digital controller which suppresses a D calculation when a set point variable is altered, thereby preventing a controlled system from malfunctioning or functioning unstably.

The third object of the invention is to provide a digital controller which obtains an appropriate I-calculation output when the output process variable increases above an upper limit or decreases below a lower limit, and which prevents a reset wind-up from occurring during the I control of the object.

The fourth object of the present invention is to provide a method of performing digital calculations in accordance with the characteristics of the PID-calculation terms, allowing for a stable and reliable PID control.

According to one aspect of the invention, a PI or PID controlling calculation is carried out on the deviation, i.e., the difference between a set point variable and an actual process variable. Velocity-type I controlling calculation is performed on the I-calculation term in accordance with the deviation, thereby obtaining an I-controlling calculation output value. The velocity-type I-controlling calculation output value is converted to a positional I signal. Meanwhile, positional P controlling calculation or a positional PD controlling calculation are performed on the P-calculation term or the PD-calculation term, respectively, in accordance with the deviation, thereby obtaining a positional P controlling calculation and a positional PD controlling calculation. The positional I signal is added to the positional P controlling calculation output or the positional PD controlling calculation output, thus acquiring a manipulative variable. The manipulative variable, thus acquired, is supplied to an object, whereby the object is controlled in accordance with the manipulative variable.

Alternatively, a velocity-type I controlling calculation is performed on the I-calculation term in accordance with the deviation, thereby obtaining an I-controlling calculation output value. The I-controlling calculation output value is converted to a positional I signal. Meanwhile, a positional P controlling calculation is performed on the P-calculation term, thereby obtaining a positional P controlling calculation, a positional D controlling calculation is carried out on the D-calculation term in accordance with a process variable, thereby obtaining a positional D controlling calculation. The positional D controlling calculation eliminates the possibility that problems arise when a D process variable increases beyond an upper and lower limit due to the alteration of the set point variable. The positional I signal, the positional P controlling calculation output, and the positional D controlling calculation output are added, thus providing a manipulative variable. This lative variable is supplied to an object, whereby the object is controlled in accordance with the manipulative variable.

Alternatively, a PI controlling output is performed on a P-calculation term and an I-calculation term in accordance the deviation, thereby obtaining an I-calculation output, or a PID controlling output is performed on a PD-calculation term and an I-calculation term in accordance with the deviation, thereby obtaining an I-calculation output. In the first case, the I-controlling calculation output is converted into a positional I signal by sweep-position signal converting means, and the positional I signal is added to the P-calculation output value obtained from the P-calculation term. The sum of these terms is input to upper/lower limiting means, which produces a manipulative variable. In the second case, the I-calculation output is converted into a positional I signal by velocity-position signal converting means, and the positional I signal is added to the PD-controlling calculation output value obtained from the PD-calculation term. The sum of these terms is input to upper/lower limiting means, which produces a manipulative variable. In either case, upper and lower limits are set to the upper/lower limiting means. The limiting means supplies the upper limit, to the velocity-position signal converting means when the input signal is over the upper limit, and supplies the lower limit thereto when the input signal is below the lower limit. In other words, the limiting means limits the magnitude of a velocity-type I controlling calculation output.

Hence, when the I-calculation term is extracted from the PI-calculation term or the PID-calculation term, and the velocity-type controlling calculation is performed on the I-calculation term, the I-calculation term will have no $\Sigma$-calculation terms. As a result of this, the digital controller according to the invention can perform calculations at a high velocity to acquire a PID process variable within a short term, a bumpless transfer easily to switch the calculation mode, and calculations on the signals processed by other devices.

According to another aspect of the invention, a positional controlling calculation is performed on D-calculation term in accordance with the process variable supplied from an object, not with a deviation i.e., the difference between a set point variable and an actual process variable. Therefore, the D-calculation term is not affected by the alteration of the set point variable. In other words, the D-calculation term causes neither the malfunction nor unstable calculation of the digital controller.

According to still another aspect of the invention, the I-calculation term is extracted from a PID-calculation term, then converted into a velocity-type I signal by means of a velocity-type controlling calculation, and is finally processed into a positional I signal by velocity-position signal converting means. Meanwhile, the PD-calculation term, i.e., the remaining part of the PID-calculation term, is subjected to positional adjustment and is converted into a positional PD controlling calculation. The positional I signal and the positional PD controlling calculation are added. The sum of the I signal and the PD controlling calculation output is input to an upper/lower limiting means to which upper and lower limits have been set. When the sum is over the upper limit, the upper limit is set to the signal converting means. When the sum is below the lower limit, the lower limit is set to the signal converting means. Hence, the velocity-type I controlling calculation output continuously controls the object as long as its magnitude remains between the upper and lower limits set to the signal converting means. Further, no reset wind-up occurs during the I action of the object.

BRIEF DESCRIPTION OF THE DRAWINGS

FIG. 7 is a block diagram illustrating a PID calculation unit which can be used in the second embodiment, in place of the PID calculation unit shown in FIG. 6;

FIG. 8 is a block diagram showing another PID calculation unit which can be incorporated in the second embodiment, in place of the PID calculation unit shown in FIG. 6, and also explaining how signals are controlled in the PID calculation unit;

DETAILED DESCRIPTION OF THE PREFERRED EMBODIMENTS

Figure 1:
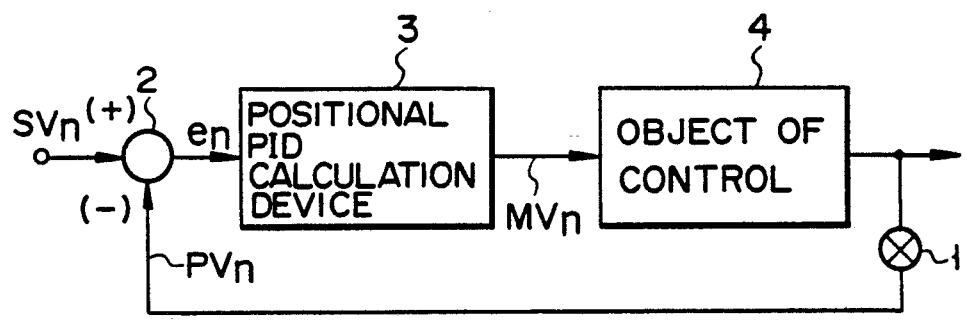
FIG. 1 a block diagram showing a prior-art, positional PID digital controller.
Figure 2:
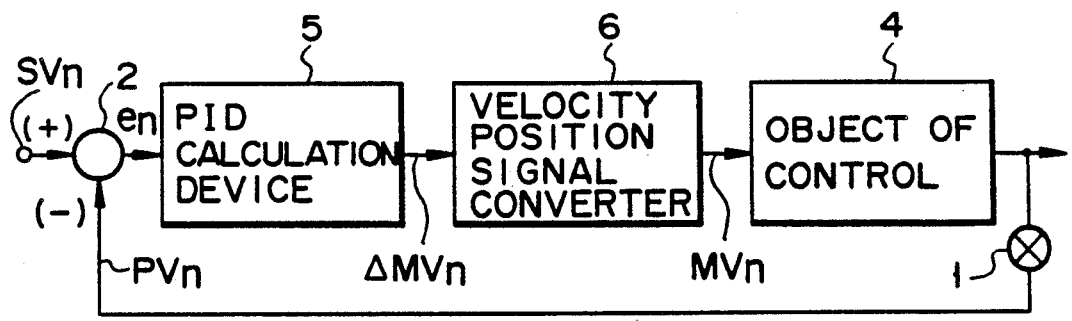
FIG. 2 is also a block diagram illustrating a conventional, velocity-type PID digital controller.
Figure 3:
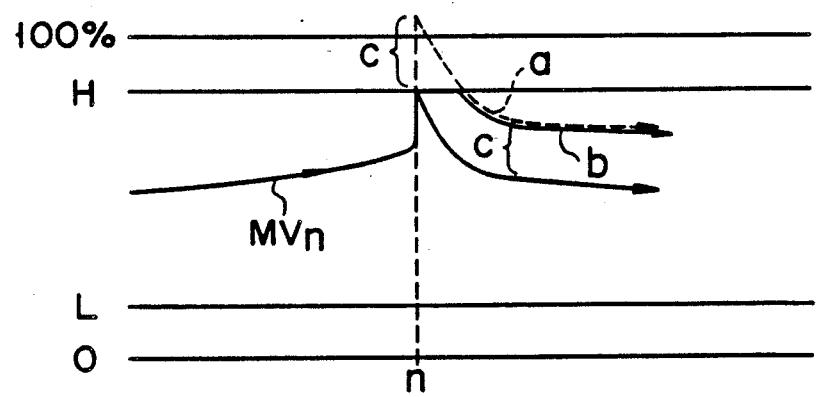
FIG. 3 is a graph representing how the manipulative variable by the controller shown in FIG. 2 changes with respect to a set point variable.

Before the embodiments of the present invention are described, the principle of PID control, and the rules of processing signals involved in the PID control, will be explained.

From equation (1), the P-calculation term is $K_p \cdot e$, the I-calculation term is $(K_p/T_1) \int e \, dt$, and the D-calculation term is $K_p \cdot T_D \cdot (de/dt)$. Obviously, the P-calculation term is proportional to the present deviation e, the I-calculation term is proportional to the integrated value of the deviations obtained in the past, and the D-calculation term is proportional to the rate at which the deviation will change in the future. Each calculation term performs the control role based on the above equation. The I-calculation term is indefinite. The P-calculation term is 0 when e=0. The D-calculation term is 0 as long as the deviation e remains unchanged. P and D-calculation term are zero standards. As a result, there is the following restriction for signal processing. Velocity-type signals can be ignored in calculating the I-calculation term. By contrast, velocity-type signals cannot be ignored in calculating the D-calculation term and the P-calculation term. This is because, if the velocity-type signals are discarded, the P-calculation term and the D-calculation term cannot be 0 when the deviation is 0 or remains unchanged.

The inventor hereof has repeated experiments, wherein signals involved in the PID control were processed in various ways, and studied the characteristics of the P-calculation term, the I-calculation term, and the D-calculation term. The results of the study were as is shown in the following table.

TABLE 1

| No. | Term | Position P | Position I | Position D | Velocity T. P | Velocity T. I | Velocity T. D | Remarks |
|---|---|---|---|---|---|---|---|---|
| 1 | Only P control possible? | Y | | | N | | | Velocity-type are indefinite |
| 2 | P-calculation range decreased | Y | | | N | | | Decreased only overrange for the velocity type |
| 3 | I calculation easy? | | N | | | Y | | Very easy for the velocity type |
| 4 | Reset wind-up prevented in I calculation? | | N | | | Y | | |
| 5 | D-calculation overrange decreased | | | Y | | | N | Decreased only overrange for the velocity type |
| 6 | Bumpless transfer easy in manual-auto switching? | | N | | | | Y | For the velocity type, MVn-1 is present manipulative variable |
| 7 | Complex calculation easy to perform? | | N | | | | Y | Only changes are limited or gain-adjusted for the velocity type |

TABLE 1-continued

| No. | Term | Position P | I | D | Velocity T. P | I | D | Remarks |
|---|---|---|---|---|---|---|---|---|
| | General Evaluation | Y | N | Y | N | Y | N | |

Note:
Y = Yes, N = No.

As is evident from Table 1, the characteristics of the P-calculation term, the I-calculation term, and the D-calculation term are different for the positional algorithm system and the velocity-control algorithm system. According to the present invention, each calculation term properly use the positional algorithm system and the velocity algorithm system, in accordance with the general evaluation shown in Table 1.

The digital controllers according to the present inventions will now be described with reference to the accompanying drawings.

Figure 4:
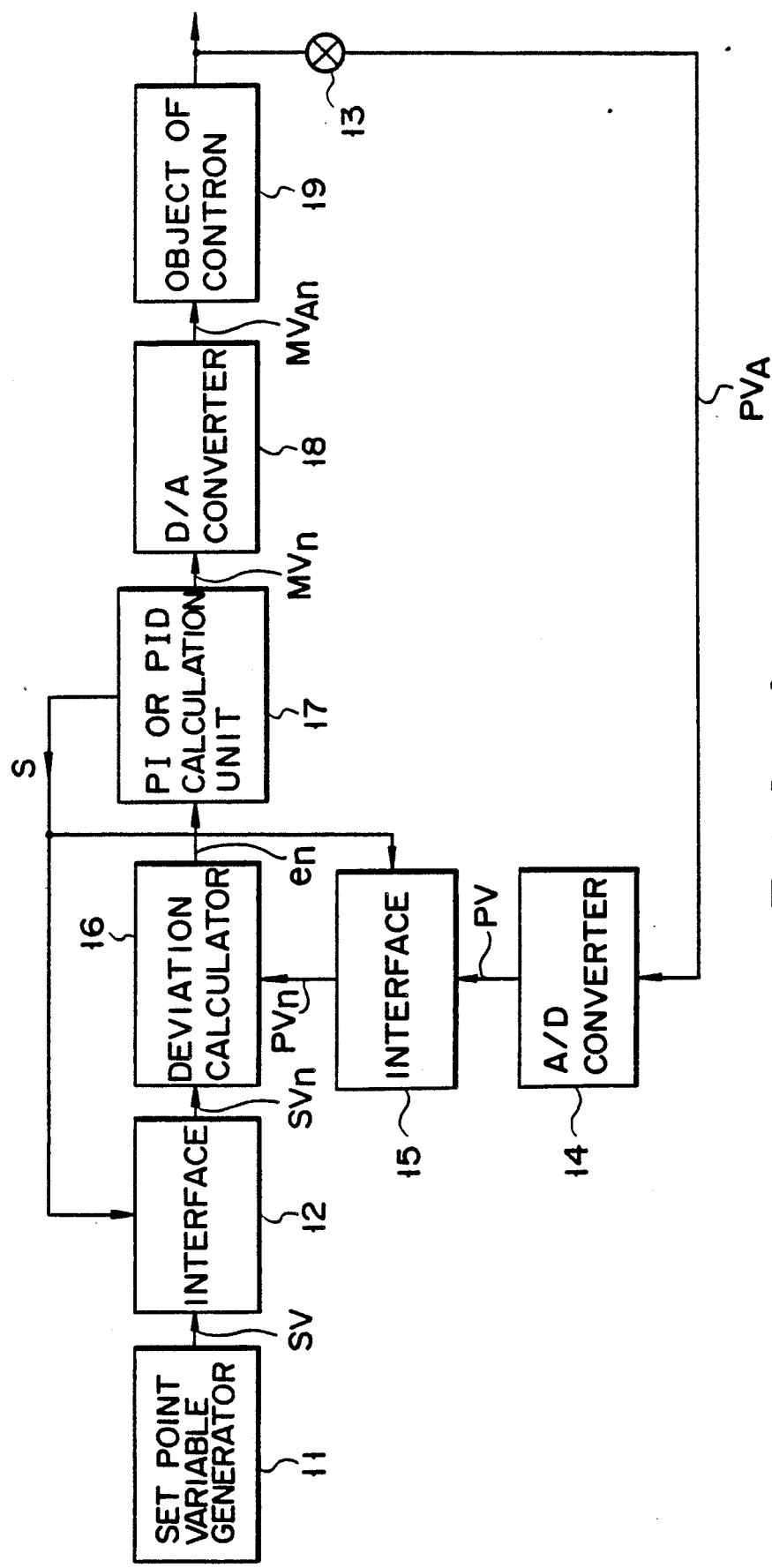
FIG. 4 is a block diagram illustrating a digital controller according to a first embodiment of the present invention.

FIG. 4 illustrates a digital controller according to a first embodiment of the present invention. As this figure shows, the digital controller comprises a set point variable generator 11, an interface 12, a detector 13, an analog-to-digital (A/D) converter 14, an interface 15, a deviation calculator 16, a PI or PID calculation control unit 17, and a digital-to-analog (D/A) converter 18.

The set point variable generator 11 is designed to generate a set point variable SV. It is a memory of the ordinary type, a program setting device or a digital data generator. If a memory of the ordinary type is used as the generator 11, it reads the set point variable SV at predetermined intervals from the memory. If a program setting device is used as the generator 11, it outputs the set point variable SV every time a predetermined period has elapsed. If a digital data generator is used as the generator 11, it generates the set point variable, either automatically or when manually operated. The interface 12 receives the set point variable SV from the generator 11, in response to a sampling signal S supplied from the PI calculation control unit 17, and outputs a presently set point variable $SV_n$. The detector 13 continuously detects the analog process variable $PV_A$ supplied from an object 19 which is connected to the D/A converter 18 and which the digital controller is to control. Alternatively, the detector 13 detects the analog process variable $PV_A$ during each sampling period. The A/D converter 14 receives the analog process variable $PV_A$ supplied from the detector 13, and converts the value $PV_A$ to digital process variable PV. The interface 15 has a memory. It receives the digital process variable PV from the A/D converter 14 in response to the sampling signal S supplied from the PI calculation control unit 17. The value PV, thus received, is stored in the memory for some time. The digital process variable PV is read from the interface 15 and is input to the deviation calculator 16 as a process variable $PV_n$.

The deviation calculator 15 receives the output of both interfaces 12 and 15, i.e., $SV_n$ and $PV_n$. The deviation calculator 15 subtracts the process variable $PV_n$ from the set point variable $SV_n$, thereby obtaining a present deviation en. The deviation $e_n$, thus obtained, is supplied to the PI calculation control unit 17. The PI calculation control unit 17 performs a PI calculation on positional algorithm system or a velocity algorithm system in accordance with the characteristics of the P-calcuation term and the I-calculation term, thereby obtaining a manipulative variable $MV_n$. The output value $MV_n$ is input to the D/A converter 18. The D/A converter 18 converts the output value $MV_n$ to an analog output value $MV_{An}$, which is supplied to the object 19 to control the object 19.

Figure 5:
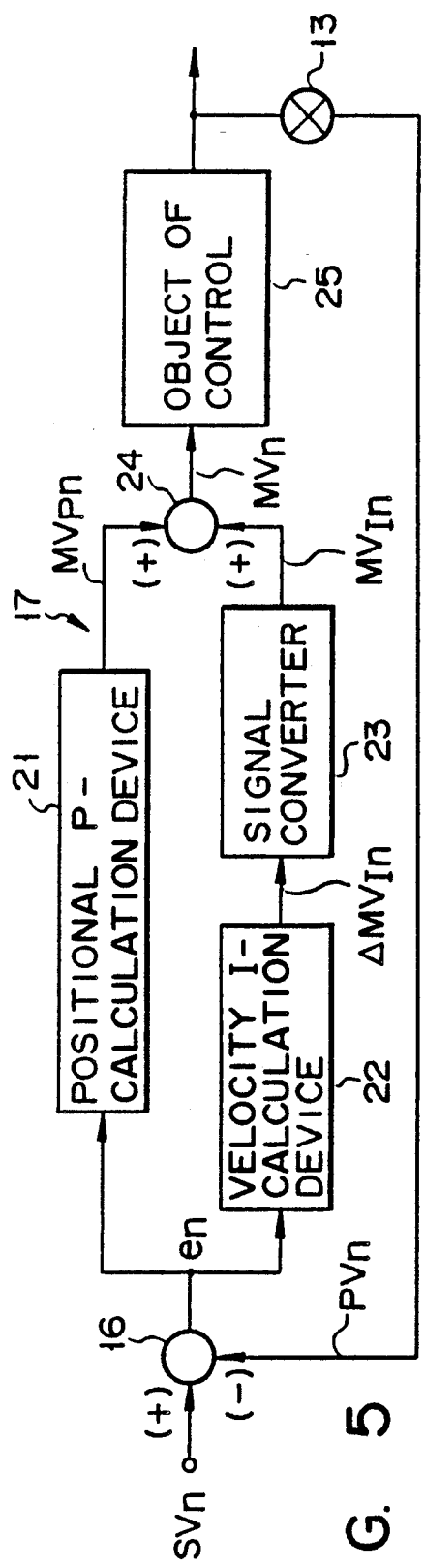
FIG. 5 is a block diagram showing a PI calculation unit incorporated in the first embodiment.

FIG. 5 illustrates the PI calculation control unit 17 in detail. The PI calculation unit 17 is suitable for use in a flow-rate control system or a pressure control system. For the sake of simplicity, it is assumed that a digital set point variable $SV_n$ and a digital process variable $PV_n$ are input to the deviation calculator 16 during each sampling period τ. The deviation calculator 16 subtracts the present process variable $PV_n$ from the present set point variable $SV_n$, thus obtaining a present deviation $e_n$ made during the sampling period. The deviation $e_n$ is supplied to the PI calculation control unit 17. The unit 17 performs positional PI calculation or velocity-type PI calculation on the present deviation $e_n$, based on the table 1 and in accordance with the characteristics of the P-calculation term and the I-calculation term.

As is shown in FIG. 5, the PI calculation control unit 17 comprises a positional P-controlling calculation device 21, a velocity-type I-controlling calculation device 22, a velocity-position signal converter 23, and an adder unit 24. The positional P-calculation device 21 is designed to perform positional P calculation on the present deviation en. The velocity-type I-controlling calculation device 22 is designed to perform a velocity-type I calculation on the present deviation $e_n$, so as to obtain a velocity-type I calculational signal. The signal converter 23 converts the velocity-type I calculational signal into a positional I signal. The adder unit 24 is coupled to the object 25. It adds the output $MV_{Pn}$ of the positional P-calculation device 21 to the output $MV_{In}$ of the velocity-position signal converter 23, thereby obtaining a manipulative variable $MV_n$.

The operation of the digital controller shown in FIGS. 4 and 5 will now be explained. First, the deviation calculator 16 subtracts the process variable $PV_n$ from the present set point variable $SV_n$, thus obtained a present deviation $e_n$ made during the sampling period. The deviation $e_n$ is supplied to the positional P-controlling calculation device 21 and the velocity-type I-controlling calculation device 22. The P-controlling calculation device 21 performs the following calculation, thus obtaining a positional P output $MV_{Pn}$:

$$MV_{Pn} = K_p \cdot e_n \qquad (4)$$

Meanwhile, the velocity-type I-controlling calculation device 22 performs the following calculation, thereby obtaining a velocity-type I output $\Delta MV_{In}$:

$$\Delta MV_{In} = K_p \cdot (\tau/T1) e_n \qquad (5)$$

The velocity-type I output $\Delta MV_{In}$ is input to the velocity-position signal converter 23. The signal converter 23 performs the following calculation, thus obtaining a positional I output $MV_{In}$:

$$MV_{In}=MV_{In-1}+\Delta MV_{In} \qquad (6)$$

The positional P output $MV_{Pn}$ and the positional I output $MV_{In}$ are input to the adder unit 24. The adder unit 24 carries out the following calculation, obtaining a manipulative variable $MV_n$:

$$MV_n=MV_{Pn}+MV_{In} \qquad (7)$$

The manipulative variable $MV_n$, thus obtained, is supplied to the object 15, thereby controlling the object 15 until $SV_n$ becomes equal to $PV_n$.

As has been described, in the digital controller shown in FIGS. 4 and 5, the P-calculation term and the I-calculation term are subject to a positional algorithm and a velocity algorithm, respectively. Therefore, this digital controller has several advantages. First, when the deviation en varies step by step and a P calculation output is over-ranged, an over-range P-calculation output, if any, is not decreased at all. Therefore, control disturbance is low and the PI control is greatly reliable. Second, the I calculation is easy and can be effected at a high velocity since the I-calculation term is extracted from the PI-calculation term and is subjected to the velocity-type calculation. Third, no reset wind-up results from the integration terms since it suffices to limit only the change $\Delta MV_{In}$ obtained for each sampling period. Furthermore, a bumpless transfer can be easily accomplished in switching the calculation mode, from the manual mode to the automatic mode, and vice versa.

Figure 6:
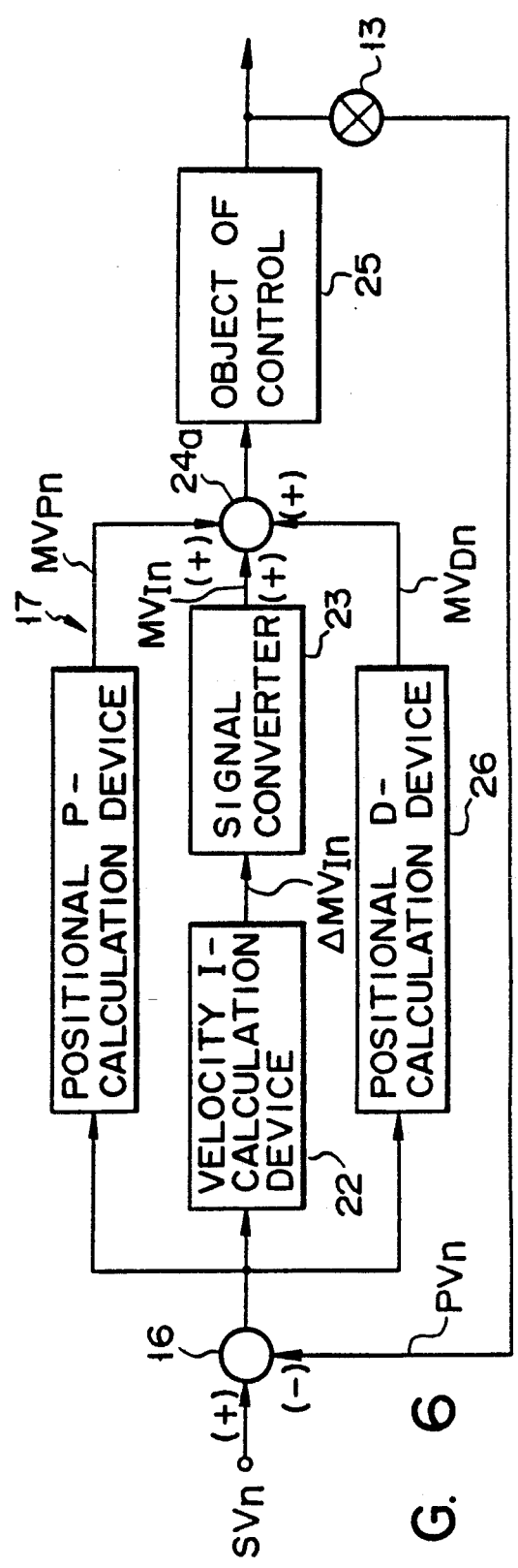
FIG. 6 is a block diagram showing the PID calculation unit incorporated in another digital controller according to a second embodiment of the present invention.

FIG. 6 shows another digital controller which is a PID calculational system and a second embodiment of the invention. The PID calculational system shown in FIG. 6 is designed to generate an manipulative variable $MV_n$ suitable for controlling a temperature control system or a level control system. As is evident from FIG. 6, the PID calculation unit 17 comprises a positional P-controlling calculation device 21, a velocity-type I-controlling calculation device 22, a signal converter 23, an adder unit 24a, and a positional D-controlling calculation device 26.

The operation of the second embodiment will now be explained. A deviation calculator 16 is used also in the second embodiment, and subtracts the process variable $PV_n$ from the set point variable $SV_n$, thus obtaining a deviation $e_n$. The deviation $e_n$ is input to the positional P-controlling calculation device 21, the velocity-type I-controlling calculation device 22, and the positional D-controlling calculation device 26. The positional P-controlling calculation device 21 performs the calculation of equation (4) on the deviation $e_n$, thus obtaining a positional P-calculation output value $MV_{Pn}$. The velocity type I-controlling calculation device 22 performs the calculation of equation (5) on the deviation $e_n$, thereby obtaining a velocity-type I-calculation output value $\Delta MV_{In}$. The value $\Delta MV_{In}$ is input to the velocity-position signal converter 23. The signal converter 23 performs the calculation of equation (6), thus obtaining a positional I-signal $MV_{In}$ In the meantime, the positional D-controlling calculation device 26 performs the following calculation on the deviation $e_n$, thereby obtaining a positional D-output value $MV_{Dn}$:

$$MV_{Dn}=K_p19\,(T_D/\tau)\cdot(e_n-e_{n-1}) \qquad (8)$$

The values output by the controlling calculation devices 21, 23, and 26 are input to the adder unit 24a. The adder unit 24a performs the following calculation on these input value obtaining a manipulative variable $MV_n$:

$$MV_n=MV_{pn}+MV_{In}+MV_{Dn} \qquad (9)$$

The manipulative variable $MV_n$, thus obtained, is supplied to the object 25, whereby the object 25 is controlled until $PV_n$ becomes equal to the set point variable $SV_n$.

In theory, the D-calculation term used in the second embodiment is exactly differential, i.e., $K_p\cdot(T_D/\tau)=K_p\cdot s$. In most cases, however, the actual D-calculation term is not exactly differential, that is, $(K_p\cdot T_D\cdot s)/\cdot(1+\eta\cdot T_D\cdot s)$, where $T_D$ is derivative time, ($1\eta 0$) is differential gain, 0 is 0.1 to 0.3 in most cases, and s is Laplace operator. Therefore, when the positional D-controlling calculation device 26 performs inexact differentiation, its output $\Delta MV_{Dn}$ will be:

$$MV_{Dn}=\frac{n\cdot T_D}{\tau+\eta\cdot T_D}MV_{Dn-1}+\frac{K_p\cdot T_D}{\tau+\eta\cdot T_D}(e_n-e_{n-1}) \qquad (10)$$

Hence, the digital controller attains the same advatnages as the digital controller having the PI calculation unit shown in FIG. 5. In addition, an over-range P-controlling calculation output and an over-range D-controlling calculation output, if any, are not decreased out. The digital controller, i.e., the second embodiment of the invention, performs a safe and reliable PID control.

FIG. 7 illustrates another PID calculational system which can be used in the second embodiment, in place of the PID calculational system shown in FIG. 6. The PID calculational system shown in FIG. 7 is identical to the PID calculational system shown in FIG. 6, except that positional D-controlling calculation device 26a performs a positional D-calculation on the process variable $PV_n$, not on the deviation $e_n$ as in the calculational system illustrated in FIGS. 5 and 6.

Generally, when D-calculation is performed on the deviation $e_n$, the D-calculation output changes if the set point variable $SV_n$ and the process variable $PV_n$ change. Therefore, the derivative term is adjusted in orer to achieve a reliable process control. However, when the deviation $e_n$ changes greatly as the set point variable $SV_n$ is altered, the differentiation will be performed to an excessive degree, inevitably causing an over-shooting of the manipulation calculation output.

According to the present invention, the changes in the set point variable $SV_n$ are ignored, and positional D-calculation is performed on the process variable $PV_n$. Therefore, no over-shooting of the manipulative variable will occur, and the digital controller having the PID calculation unit shown in FIG. 7 accomplishes a safe and reliable PID control.

FIG. 8 shows another PI calculational system which can be used in the second embodiment of the invention, in place of the PID calculational system illustrated in FIG. 6. The PI calculational system shown in FIG. 8 is designed to limit not only the manipulative variable $MV_n$ but also the I-calculation output, when necessary, in accordance with the various conditions of an object 25. As is illustrated in FIG. 8, this PI calculational system comprises a positional P-controlling calculation device 21, a velocity-type I-controlling calculation device 22, a velocity-position signal converter 31, an adder unit 32, and an upper/lower limiter 33. The signal converter 31 performs two functions: (i) to convert the output of the velocity-type I-controlling calculation device 22 to a positional I-signal, and (ii) to limit the output of the positional 1-signal in accordance with the upper limit H and the lower limit L set to it by the upper/lower limiter 33. The adder unit 32 is used to add the outputs of the controlling calculation devices 21 and 31, so as to obtain manipulative variable $MV_n$. The upper limit H and the lower limit L have been externally set to the upper/lower limiter 33. The limiter 33 reduces the manipulative variable $MV_n$ output from the adder unit 32 to the upper limit H when the value $MV_n$ is over the upper limit H, and maintain the value $MV_n$ at the lower limit L when the value $MV_n$ is less than the lower limit L.

The operation of the PI control unit shown in FIG. 8 will now be explained. The deviation calculator 16 subtracts the process variable $PV_n$ from the set point variable $SV_n$, thus obtaining a deviation $e_n$. The deviation $e_n$ is input to the positional P-controlling calculation device 21 and the velocity-type I-controlling calculation device 22. The positional P-controlling calculation device 21 performs the calculation of equation (4) on the deviation $e_n$, thus obtaining a positional P-calculation output value $MV_{Pn}$. The value $MV_{Pn}$ is input to the adder unit 32. The velocity-type I-controlling calculation device 22 performs the calculation of equation (5) on the deviation $e_n$, thereby obtaining a velocity-type I-calculation output value $\Delta MV_{In}$. The value $\Delta MV_{In}$ is input to the signal converter 31. The signal converter 31 converts the value $\Delta MV_{In}$, without limiting the same, to a positional I-signal. The I-signal is input to the adder unit 32.

The adder unit 32 adds the value $MV_{Pn}$ and the value $MV_{In}$, thus obtaining manipulative variable $MV_n$. The manipulative variable $MV_n$ is input to the upper/lower limiter 33. The upper/lower limiter 33 reduces the manipulative variable $MV_n$ to the upper limit H when the value $MV_n$ is greater than the upper limit H, and maintains the output value $MV_n$ at the lower limit L when the value $MV_n$ is less than the lower limit L. The manipulative variable $MV_n$, thus processed, is supplied to the object 25.

Unless the value $\Delta MV_{In}$ is limited when the manipulative variable $MV_n$ is greater than the upper limit H or less than the lower limit L, the manipulative variable $MV_n$ gradually increases along with the I-signal $MV_{In}$, eventually causing a reset wind-up. To prevent a reset wind-up, the integration can be stopped when the manipulative variable $MV_n$ maintains to the upper limit H or decreases to the lower limit L. In this regard, the value $MV_n$ maintain over the upper limit H or is maintained below the lower limit L, in most cases, due to the changes in the proportional component or differential component of the value $MV_n$ which appear before the integral component. It follows that the integral output value, which has yet to change, still remains when the manipulative variable $MV_n$ reaches the upper limit H or the lower limit L. Consequently, the integral component of the value $MV_n$ will be discarded.

In the PI calculational system shown in FIG. 8, when the manipulative variable $MV_n$ reaches the upper limit H set to the upper/lower limiter 33 or the lower limit thereof, the upper limit H or the lower limit L is set to the signal converter 31. Then, the integration is performed until the I-signal $MV_{In}$ output by the signal converter 31 reaches the upper limit H or the lower limit L, thereby preventing a reset wind-up.

Therefore, the digital controller having the PI calculational system shown in FIG. 8 is advantageous, in the following respects, over a digital controller wherein the integration is stopped the moment the manipulative variable $MV_n$ reaches the upper limit H or the lower limit L. First, the controller can control the object, exactly in accordance with the changes in the condition of the object, since the I-signal $MV_{In}$ has an appropriate value due to the continuous integration even if the manipulative variable $MV_n$ decreases below the upper limit H after it has reached the upper limit H, or is maintained above the lower limit L after it has reached the lower limit L. Second, that portion of the I-signal $MV_{In}$ which is maintained is reduced when a velocity-type signal SA is added to the I-signal during a feed-forward control, since the signal converter 32 is set to the upper limit H when the output value $MV_n$ is maintained to the upper limit H, or the lower limit L is set to the converter 31 when the manipulative variable $MV_n$ is maintained to the lower limit L. Owing to the reduction of the discarded portion of the I-signal, the digital controller can not only prevent a reset wind-up, but can accomplish a reliable combined advanced control.

Figure 9:
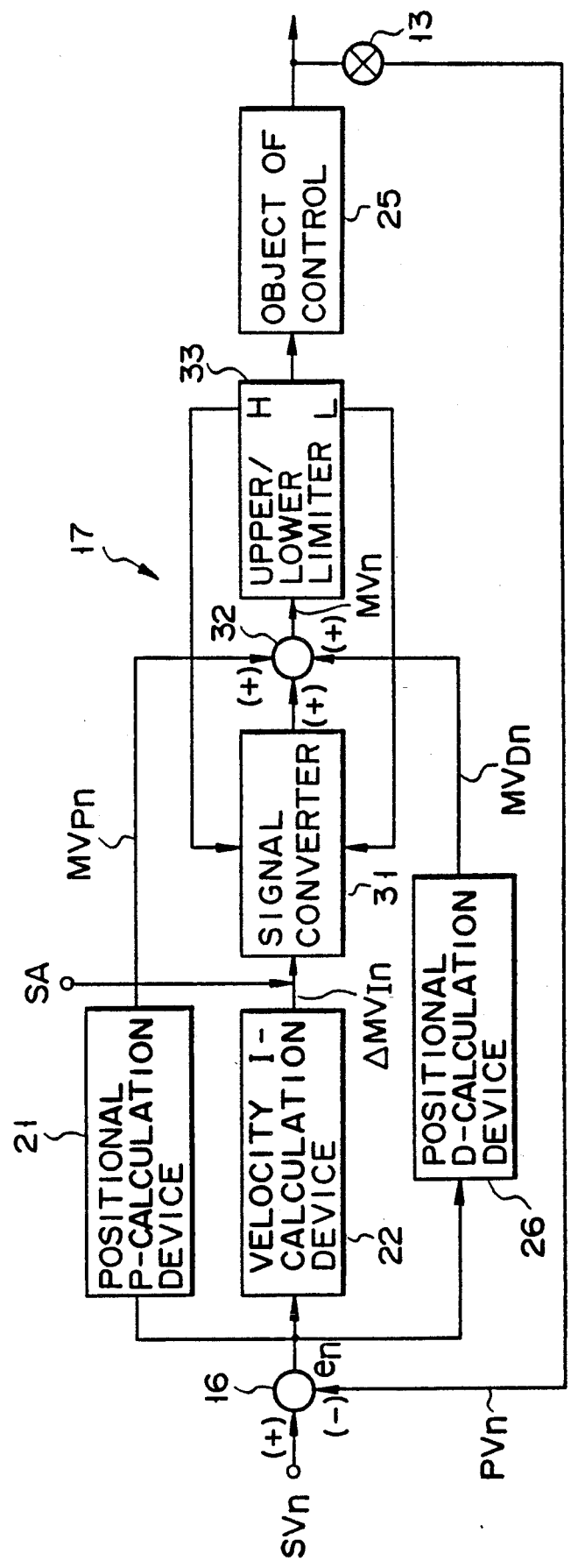
FIG. 9 is a block diagram showing still another PID calculation unit which can be incorporated in the second embodiment, in place of the PID calculation unit shown in FIG. 6, and also explaining how signals are controlled in the PID calculation unit.

FIG. 9 also illustrates a PID calculational system which can be used in the second embodiment of the invention, in place of the PID calculational unit shown in FIG. 6. The PID calculational system shown in FIG. 9 is identical to the unit shown in FIG. 8, except that a positional D-calculation controlling device 26 is used. The unit operates in the same way as the PID calculational system shown in FIG. 8, so as to attain the same advantages.

Figures 10, 11:
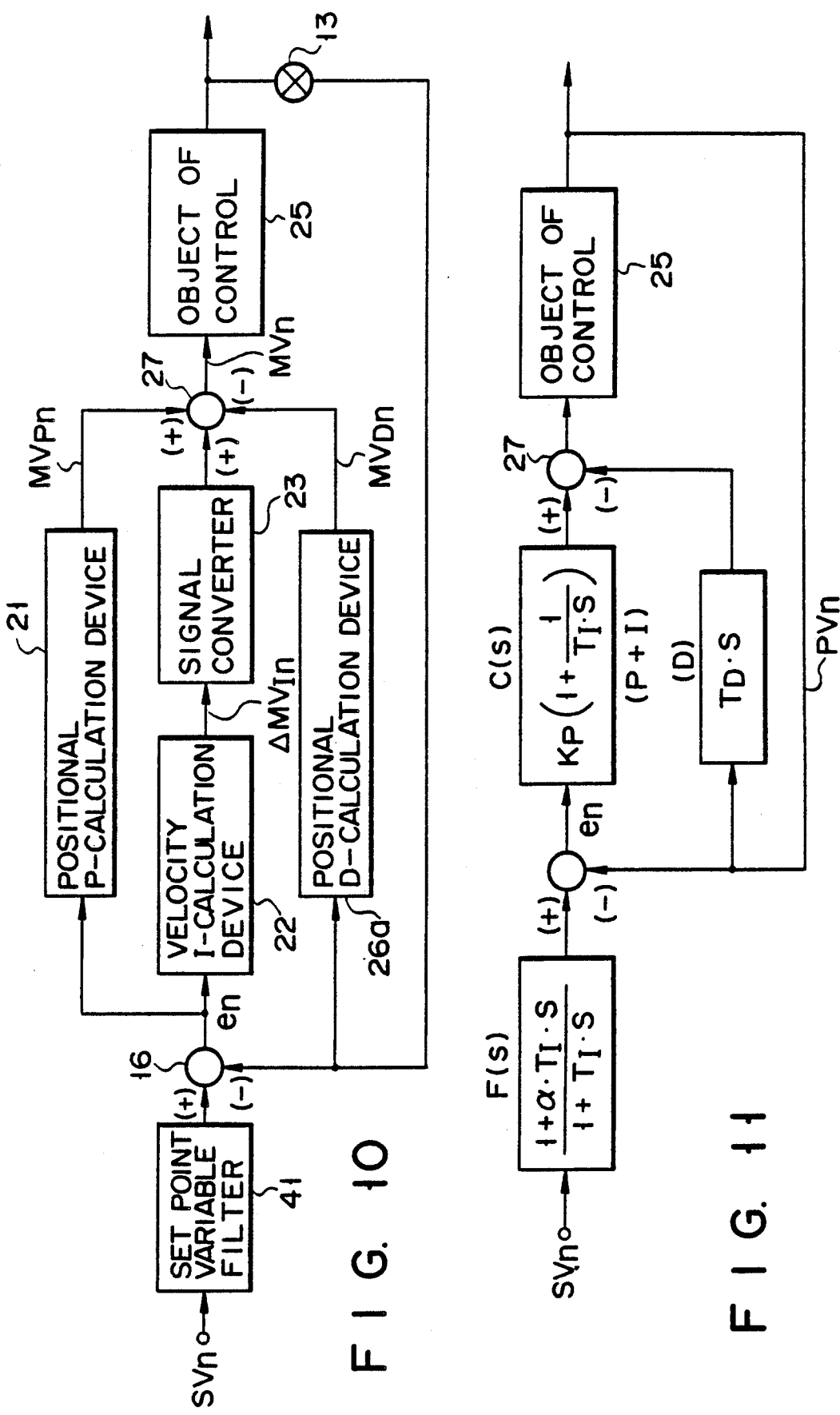
FIG. 10 is a block diagram showing another PID calculation unit which can be incorporated in the second embodiment, in place of the PID calculation unit shown in FIG. 6, and also illustrating a set point variable filter used in combination with the PID calculation unit.
FIG. 11 is a diagram showing the components of the PID calculation unit and the set point variable filter, in terms of transmission functions.

FIG. 10 is a schematic representation of another PID calculational system which can be used in the second embodiment of the invention, in place of the PID calculational system shown in FIG. 6. Like the PID calculational system shown in FIGS. 6, 7, 8, and 9, this unit performs either a positional or a velocity-type on a P-calculation term, an I-calculation term, and a D-calculation term, in accordance with the characteristics of these calculation terms. As can be understood from FIG. 10, this PID calculational system is different from those illustrated in FIGS. 6, 7, 8, and 9, in that a set point variable filter 41 is connected between an interface 12 (FIG. 4) and a deviation calculator 16.

The PID calculation unit shown in FIG. 10 is designed to add a control constant to a P-calculation term and an I-calculation term, thereby to control the influence of external disturbance on the manipulative variable $MV_n$. More specifically, the parameter of the set point variable filter 41 is switched between two values in accordance with the magnitude of the external disturbance, thereby to change the control constant only, so that the object 25 is controlled most appropriately.

The control system illustrated in FIG. 10 can be represented by the transfer functions shown in FIG. 11. The influence of the alteration of the set point variable $SV_n$ on the P-calculation term is given by:

$$F(s) \cdot C(s) = \frac{1 + \alpha \cdot T_I \cdot S}{1 + T_I \cdot S} \cdot K_p \left(1 + \frac{1}{T_I \cdot S}\right)$$

$$= \frac{1 + \alpha \cdot T_I \cdot S}{1 + T_I \cdot S} \cdot K_p \cdot \frac{1 + T_I \cdot S}{T_I \cdot S}$$

$$= K_p \left(\alpha + \frac{1}{T_I \cdot S}\right)$$

As is obviously understood from the above equation, the control constant $K_p$ of the P-calculation term changes between two values when the parameter $\alpha$ of the set point variable filter 41 is switched between two values in accordance with the magnitude of the external disturbance. Therefore, the digital controller having the PID calculational system shown in FIG. 10 performs an optimal control of the object 25 even when the set point variable $SV_n$ is altered.

What is claimed is:

1. A digital controller in which a process variable of an object is measured, a deviation between a measured value and a desired value is calculated, a positional P-calculation is performed in accordance with the deviation to obtain a positional P-calculation signal, a velocity-type I-calculation is performed in accordance with the deviation, to obtain a velocity-type I-calculation signal, and a condition of the object is controlled in accordance with the positional P-calculation signal and the velocity-type I-calculation signal, said controller comprising:

signal converting means wherein a first upper limit and a first lower limit of a magnitude of a converted signal can be externally determined, wherein when said first upper and first lower limits are not externally determined, said signal converting means converts said velocity-type I-calculation signal into a positional I-signal and outputs said positional I-signal, when said first upper limit is externally determined, said signal converting means converts said velocity-type I-calculation signal into a positional I-signal, and when the magnitude of said positional I-signal is of a value equal to or less than said first upper limit, said signal converting means outputs said positional I-signal as is, and when the magnitude is of a value exceeding said first upper limit, said signal converting means outputs said positional I-signal after limiting the magnitude to said first upper limit, and when said first lower limit is externally determined, said signal covnerting means converts said velocity-type I-calculation signal into a positional I-signal, and when the magnitude of said positional I-signal is of a value equal to or greater than said first lower limit, said signal converting means outputs said positional I-signal as is, and when the magnitude is of a value below said first lower limit, said signal converting means outputs said positional I-signal after limiting the magnitude to said first lower limit;

adder means for adding the positional I-signal input from said signal converting means and said positional P-calculation signal together, to thereby obtain a first manipulation signal; and upper/lower limiting means, a second upper limit and a second lower limit of which are predetermined, and which, when the magnitude of the first manipulation signal input from said adder means has a value exceeding said second upper limit, outputs said first manipulation signal as a second manipulation signal after limiting the magnitude of said first manipulation signal to said second upper limit and sets said first upper limit at said second upper limit, and when the magnitude of the first manipulation signal input from said adder means has a value below said second lower limit, outputs said first manipulation signal as a second manipulation signal after limiting the magnitude of said first manipulation signal to said second lower limit and sets said first lower limit at said second lower limit;

said controller controlling the condition of the object so as to make said process variable equal to said desired value, in accordance with the second manipulation signal output from said upper/lower limiting means.

2. A digital controller in which a process variable of an object is measured, a deviation between a measured value and a desired value is calculated, a positional P-calculation is performed in accordance with the deviation, to obtian a positional P-calculation signal, a velocity-type I-calculation is performed in accordance with the deviation, to obtain a velocity-type I-calculation signal, a positional D-calculation is performed in accordance with the deviation, to obtain a positional D-calculation signal, and a condition of the object is controlled in accordance with the positional P-calculation signal, the velocity-type I-calculation signal, and the positional D-calculation signal, said controller comprising:

signal converting means, wherein a first upper limit and a first lower limit of a magnitude of a converted signal can be externally determined, wherein when said first and upper and lower limits are not externally determined, said signal converting means converts said velocity-type I-calculation signal into a positional I-signal and outputs said positional I-signal, when said first upper limit is externally determined, said signal converting means converts said velocity-type I-calculation signal into a positional I-signal, and when the magnitude of said positional I-signal is of a value equal to or less than said first upper limit, said signal converting means outputs said positional I-signal as is, and when the magnitude is a of a value exceeding said first upper limit, said signal converting means outputs said positional I-signal after limiting the magnitude to said first upper limit, and when said first lower limit is externally determined, said signal converting means converts said velocity-type I-calculation signal into a positional I-signal, and when the magnitude of said positional I-signal is of a value equal to or greater than said first lower limit, said signal converting means outputs said positional I-signal as is, and when the magnitude is of a value below said first lower limit, said signal converting means outputs said positional I-signal after limiting the magnitude to said first lower limit;

adder means for adding the positional I-signal input from said signal converting means, said positional P-calculation signal, and said positional D-calculation signal together, to thereby obtain a first manipulation signal; and upper/lower limiting means, a second upper limit and a second lower limit of which are predetermined, and which, when the magnitude of the first manipulation signal input from said adder means has a value exceeding said second upper limit, outputs said first manipulation signal as a second manipulation signal after limiting the magnitude of said first manipulation signal to said second upper limit and sets said first upper limit at said second upper limit, and, when the magnitude of the first manipulation signal has a value below said second lower limit, outputs said first manipulation signal as a second manipulation signal after limiting the magnitude of said first manipulation signal to said second lower limit and sets said first lower limit at said second lower limit;

said controller controlling the condition of the object so as to make said process variable equal to said desired value, in accordance with the second manipulation signal output from said upper/lower limiting means.

* * * * *